United States Patent
Witt et al.

(10) Patent No.: US 11,389,743 B2
(45) Date of Patent: **\*Jul. 19, 2022**

(54) DEVICE FOR VISUALLY SIMULATING SPARKS AND METHODS OF USING THE SAME

(71) Applicant: Universal City Studios LLC, Universal City, CA (US)

(72) Inventors: Coy Witt, Riverside, CA (US); Warren Kong, Ontario, CA (US); Julia Warren, Morganton, NC (US); Daniel Bergher, Long Beach, CA (US); Courtney Elkind, Los Angeles, CA (US); Honora Penny, Upland, CA (US)

(73) Assignee: Universal City Studios LLC, Universal City, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/896,217

(22) Filed: Jun. 9, 2020

(65) Prior Publication Data
US 2020/0316489 A1  Oct. 8, 2020

Related U.S. Application Data

(63) Continuation of application No. 16/436,931, filed on Jun. 11, 2019, now Pat. No. 10,675,553.

(60) Provisional application No. 62/829,032, filed on Apr. 4, 2019.

(51) Int. Cl.
*A63J 5/02* (2006.01)
*F21V 8/00* (2006.01)
*G09F 19/12* (2006.01)
*F21Y 115/10* (2016.01)

(52) U.S. Cl.
CPC .............. *A63J 5/02* (2013.01); *G02B 6/0008* (2013.01); *F21Y 2115/10* (2016.08)

(58) Field of Classification Search
CPC .. F24C 7/00; F24C 7/004; G09F 19/00; G09F 19/12; A63J 5/02; G02B 6/0008
USPC ...................................................... 472/45–46
See application file for complete search history.

(56) References Cited

U.S. PATENT DOCUMENTS

| 4,203,241 | A | \* | 5/1980 | Wallace | ................. | G09F 19/10 |
| | | | | | | 40/406 |
| 4,974,134 | A | | 11/1990 | Bourne | | |
| 5,142,463 | A | | 8/1992 | Panagotacos | | |
| 5,739,462 | A | | 4/1998 | Poor et al. | | |
| 6,099,139 | A | | 8/2000 | Lapensee | | |
| 6,757,487 | B2 | | 6/2004 | Martin et al. | | |

(Continued)

FOREIGN PATENT DOCUMENTS

| CA | 2552708 | C | 1/2007 |
| GB | 2391300 | A | 4/2004 |

(Continued)

*Primary Examiner* — Kien T Nguyen
(74) *Attorney, Agent, or Firm* — Fletcher Yoder, P.C.

(57) ABSTRACT

The present invention provides a special effects device for simulating sparks generated by combustion, electricity, or other means. The device may include light-emitting devices mechanically connected to extendable structures that are spatially dispersed by an actuator during the operation of the special effects device. The special effects device may be coordinated with a device for simulating combustion to give the impression of sparks generated by a combustion source.

21 Claims, 4 Drawing Sheets

(56) References Cited

U.S. PATENT DOCUMENTS

| | | |
|---|---|---|
| 6,953,401 B2 | 8/2005 | Starr |
| 6,955,440 B2 | 8/2005 | Niskanen |
| 7,080,472 B2 | 7/2006 | Schroeter et al. |
| 7,300,179 B1 | 11/2007 | LaDuke et al. |
| 8,500,038 B2 * | 8/2013 | Fuller .................. B05B 7/0807 239/18 |
| 9,366,402 B2 | 6/2016 | Li |
| 9,551,470 B2 | 1/2017 | Li |
| 2006/0034100 A1 | 2/2006 | Schnuckle et al. |
| 2006/0098428 A1 | 5/2006 | Rosserot |
| 2006/0133096 A1 | 6/2006 | Corbett |
| 2009/0135611 A1 | 5/2009 | Lin |
| 2009/0205633 A1 | 8/2009 | Hussong et al. |
| 2010/0209860 A1 | 4/2010 | Zhu |

FOREIGN PATENT DOCUMENTS

| | | |
|---|---|---|
| WO | 0157447 A1 | 9/2001 |
| WO | 2008092753 A2 | 7/2008 |

\* cited by examiner

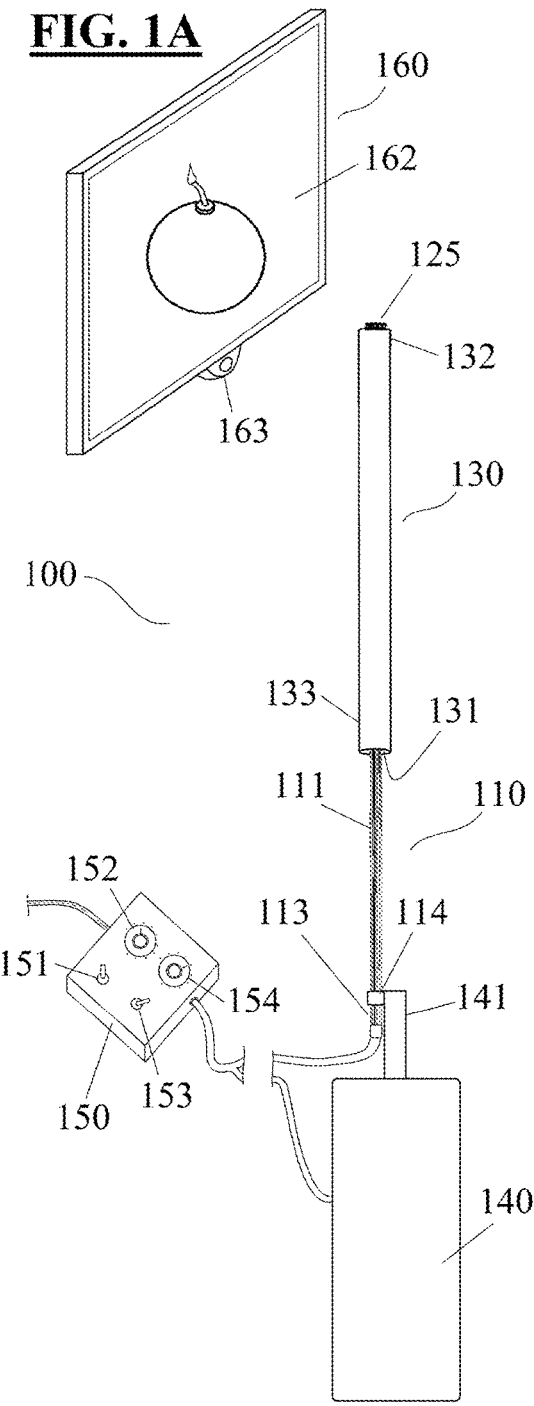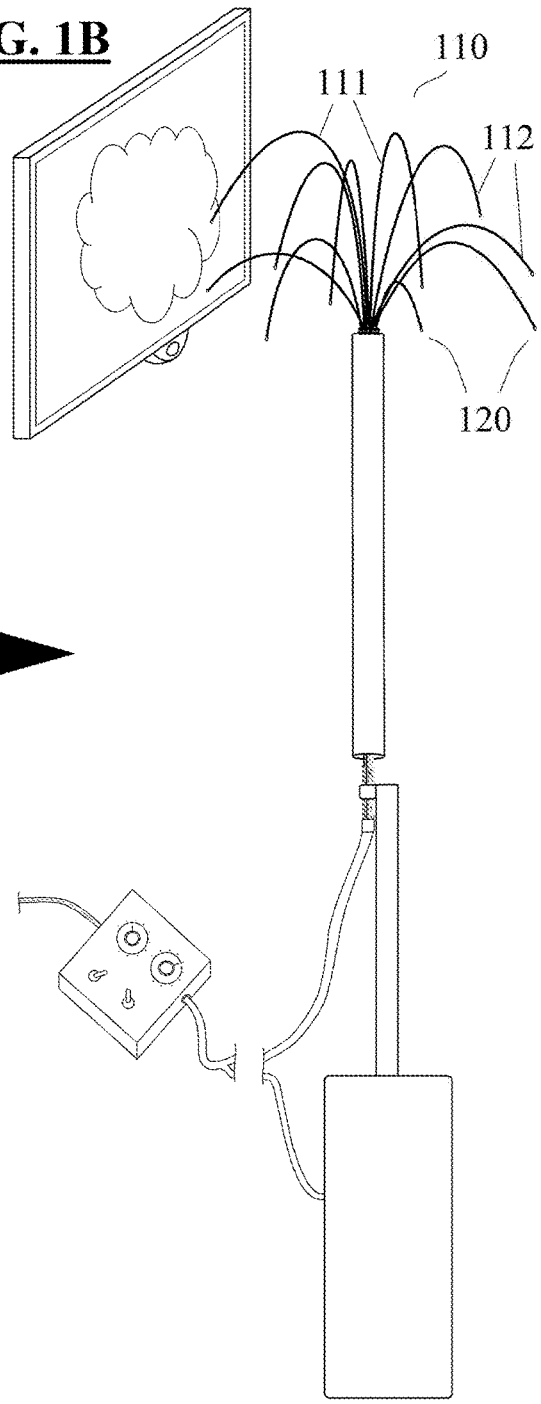

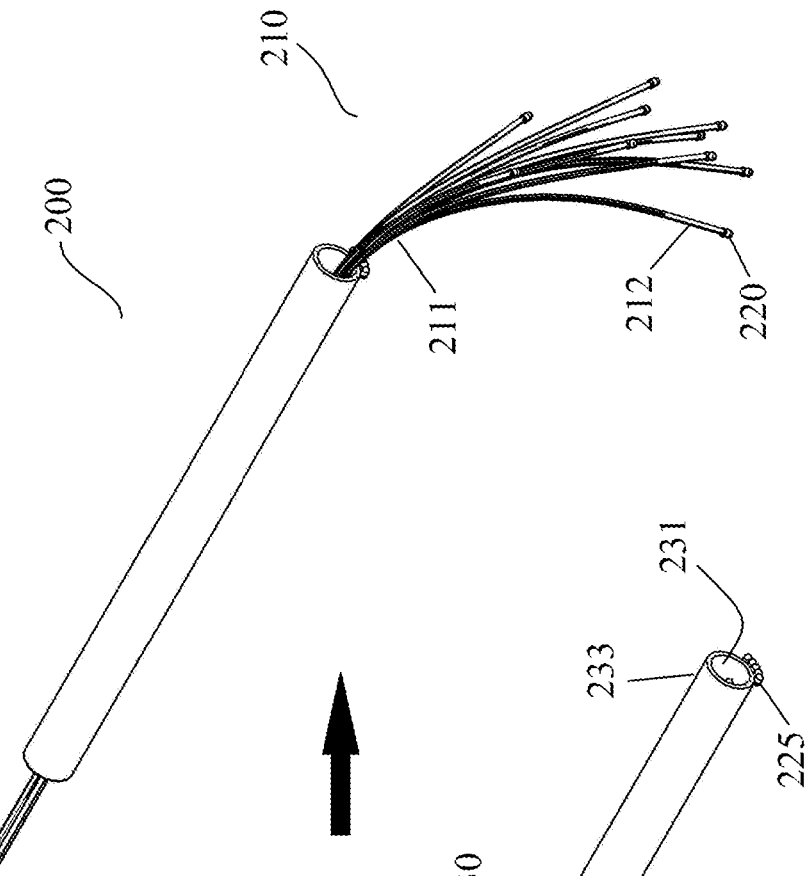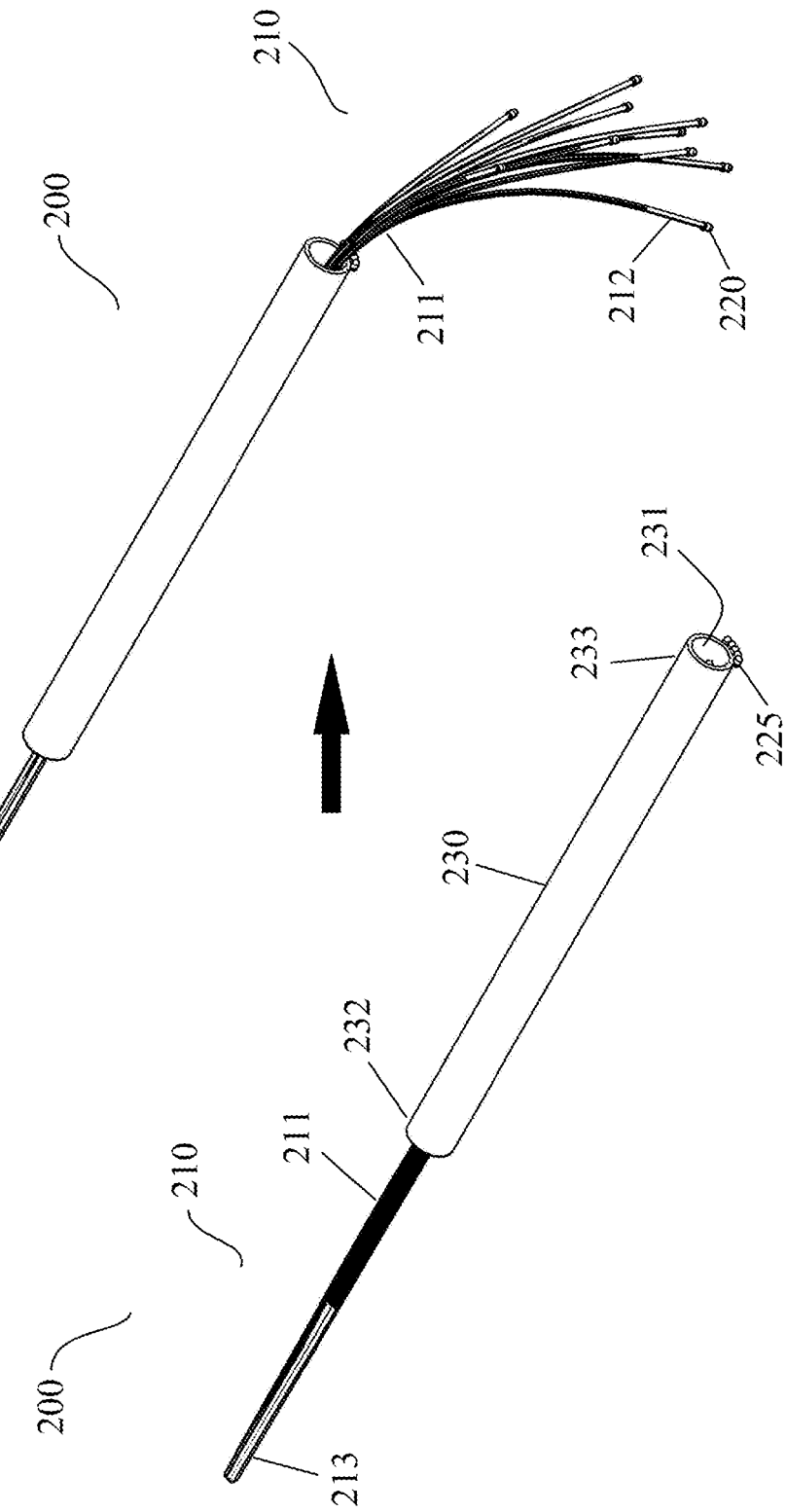

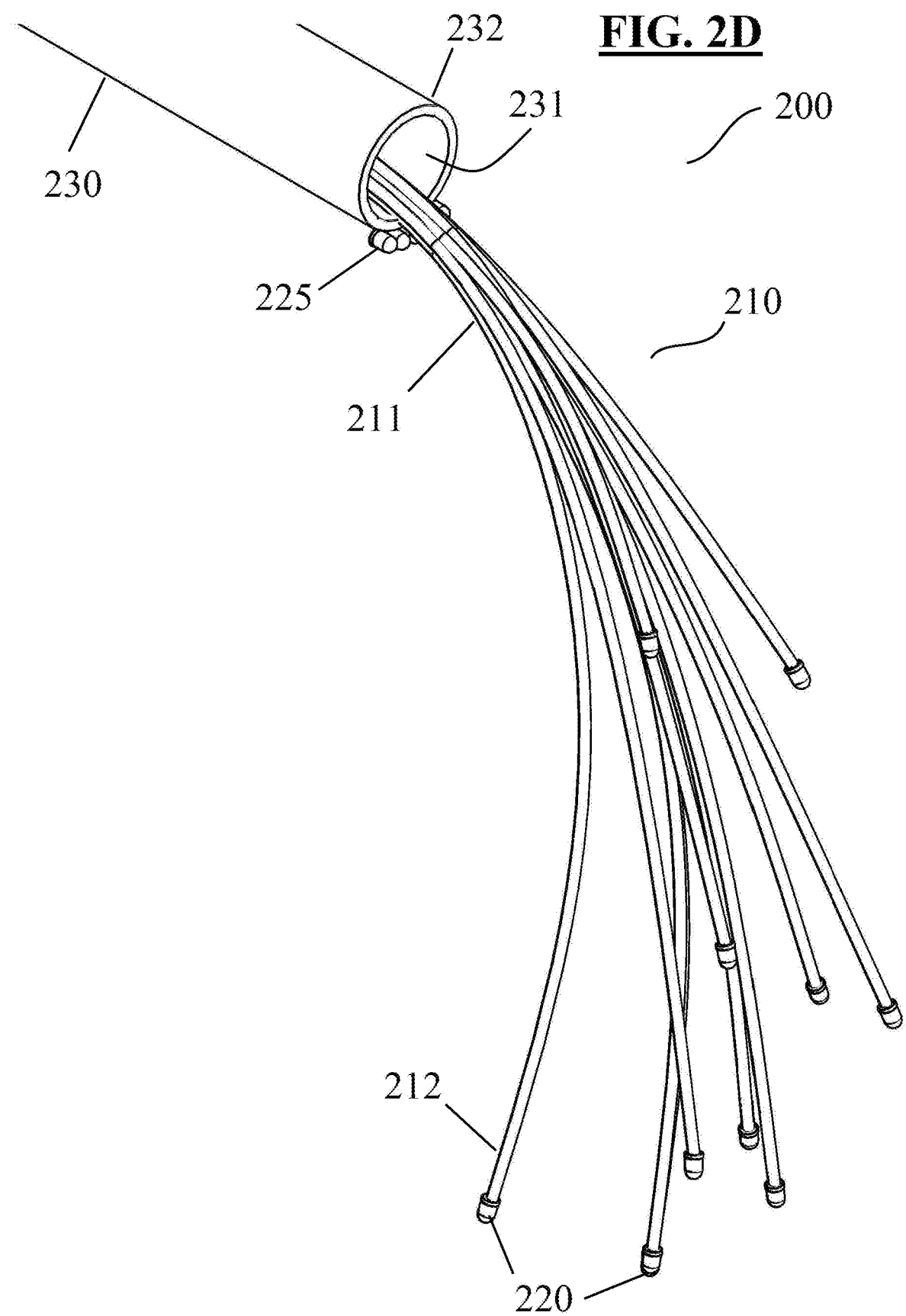

DEVICE FOR VISUALLY SIMULATING SPARKS AND METHODS OF USING THE SAME

FIELD OF THE INVENTION

The present invention relates generally to a device for visually simulating combustion with artificial light effects and methods of using the same. More particularly, the present invention uses mechanical actuation and light-emitting devices to create a visual simulation effect that resembles sparks resulting from combustion for entertainment purposes.

BACKGROUND OF THE INVENTION

Artificial fire effects for entertainment purposes are commonplace and have been used in amusement park rides and installations, Halloween props, stage and film productions, and other, different kinds of decorations. They provide a safe mechanism for simulating fire, explosions, ballistic weapons, and other dangerous combustion mechanisms. Such effect mechanisms produce negligible heat, no refueling is necessary, and they produce no messy combustion products, such as smoke and burnt fuel (and thus no exhaust or ash collection is necessary). Such technologies provide safety benefits, they are relatively clean, and they eliminate the risks of real combustion mechanisms, which may fail, burn out, or extinguish unexpectedly.

There are several types of devices that generate artificial flames and explosions (e.g., simulated gun fire, explosions, etc.). For example, fire simulations may include a silk sheet which is undulated and illuminated to give the appearance of a moving flame. Another device for generating an artificial flickering flame effect is a lamp having a flicker circuit, wherein the flicker circuit is used to modulate the glowing light source within the bulb, thereby giving an appearance of a candle burning inside a lantern or a sconce. In a further example, gun fire may be simulated by a blast of steam or dust combined with a reddish light to give the impression of a muzzle flash.

However, none of the conventional systems for simulating flames and combustion have been able to provide an effective simulation of sparks resulting from combustion or explosions. Improved artificial combustion effect systems are needed to address the shortcomings of conventional systems.

SUMMARY OF THE INVENTION

The present invention provides a special effects device for simulating sparks generated by combustion, electricity, or other means. The device may include light-emitting devices mechanically connected to extendable structures that are spatially dispersed by an actuator during the operation of the special effects device. The special effects device may be coordinated with a device for simulating a combustion effect to give the impression of sparks generated by a combustion source such as an explosion, a fire, an electrical arc, etc. The special effects device may include the following major components: a plurality of combustion simulating elements, each having a light-emitting device; a sleeve for holding the plurality of combustion-simulating elements in first positions; and an actuator for protruding the combustion-simulating elements from the sleeve into second positions wherein the light-emitting devices of the combustion-simulating elements are more spatially dispersed than in the first positions.

The special effects device of the present invention may be used in a number of settings. In a first example, the special effects device may be incorporated into an attraction at an amusement park for simulating sparks from a downed power line, a firing cannon, or a burning building. In a second example, the special effects device may be incorporated into a theatre production, simulating sparks from an explosion or a distant firework. In a third example, the special effects device may be incorporated into a commercial display, simulating sparks from a part being welded onto a truck, or a fire started from a hot new product. Many other uses will become apparent to one skilled in the art through the following explanations and the attendant drawings.

The special effects device of the present invention provides several improvements over conventional spark simulation systems. The special effects device allows for a realistic simulation of sparks while producing very little heat and presenting no safety hazard. Therefore, far less stringent safety precautions can be taken (e.g., smaller minimum safe distance from an attraction), and there is virtually no chance of starting a fire due to an errant spark landing on combustible material (e.g., paper, wood, or a person's hair or costume). Also, less work is required for installation of the special effects device, avoiding expensive retrofitting, safety precautions, and reconstruction that may be required for other kinds of combustion effects (e.g., actual sparks, which may need a fuel source, open wires, and a larger minimum safe area). The special effects device of the present invention produces no combustion products (e.g., carbon dioxide, carbon monoxide, etc.) and is environmentally clean. The special effects device is also environmentally friendly and inexpensive in that it consumes only a relatively small amount of electricity, and is quickly and easily reusable. Finally, the special effects device is beneficial in that it requires very little maintenance, can be quickly and easily reset, and when maintenance is required the device may be handled by maintenance personnel without the need to first let it cool down or drain a fuel source.

The special effects device of the present invention may be used in combination with other special effects systems in order to enhance the visual display of each. For example, the special effects device may be used in combination with a combustion effect system which simulates at least one of a visual effect (e.g., a simulated flame or explosion) and an audio effect (e.g., at least one of a low burning sound, a burning sound which gains in intensity and/or volume, a loud explosive sound, and a combination thereof). In a coordinated simulation, the combustion effect system may simulate a flame leading to an explosion which causes the sparks simulated by the special effects device.

The combustion simulation may alternatively simulate sparks related to arc welding, electrical arcing, a lightning strike, a burning building, an explosion, ballistic weapon fire, or any other situation which may lead to an explosion of sparks. In some embodiments, the visual effect may be simulated via a visual display comprising at least one of a monitor (e.g., a television or computer monitor), visual effects screens used in amusement rides, an animatronic installation such as those commonly utilized at theme parks, and other practical effects like combinations of light, sound, and/or motion effects. In some embodiments, the visual effect may comprise features and functionalities comparable to at least one of a simulated fireplace (e.g., comprising a housing with a light source and at least one of a light randomizer, a light filter screen, and a light diffuser screen), a simulated candle (e.g., comprising a light source, and a moving, reflective, flame shaped light reflector), an LED panel or matrix operable to simulate a flame, and a combination thereof.

Actuation of the spark effect of the present invention may be initiated by a controller, and may be timed in coordination with at least one of the visual effect and the audio effect of the combustion effect system. The spark effect may be timed to actuate simultaneously with at least one of the visual effect and the audio effect, or actuation of the spark effect may be delayed for a predetermined amount of time (e.g., from about 0.5 seconds to about 30 seconds, and preferably from about 1 second to about 5 seconds) after at least one of the visual effect and audio effect. The present invention may provide a plurality of special effects devices used in combination with a single combustion effect system, wherein each of the plurality of special effects devices is timed to actuate either simultaneously, or at different delay times after actuation of at least one of the visual effect and audio effect of the combustion effect system (e.g., wherein the combustion effect system may display a sequence of explosions, each explosion timed to coordinate with a different special effects device).

The special effects device of the present invention may comprise a plurality of combustion simulating elements, each having a light-emitting device; a sleeve for holding the plurality of combustion-simulating elements in first positions; and an actuator for protruding the combustion-simulating elements out of the sleeve and into second positions, wherein the light-emitting devices are more spatially dispersed than in the first positions. In some embodiments, the special effects device may further comprise a static light-emitting device, which may serve to simulate a combustion source of the sparks and may be positioned in proximity to an end of the sleeve (e.g., mounted at the distal rim thereof).

The present invention may comprise a plurality of combustion simulating elements in a range from 2 to about 20 (e.g., from about 5 to about 15, or from about 8 to about 12). In some embodiments, the present invention may comprise about 10 combustion simulating elements. The plurality of combustion simulating elements may each comprise an arm with a first end and a second end, the first end comprising a light-emitting device, and the second end comprising a connection to the actuator and a controller or power source. In some embodiments, each arm may comprise an outer diameter in a range from about 1/16 inch to about 3/4 inch (e.g., from about 1/8 inch to about 1/2 inch, or from about 1/8 inch to about 1/4 inch). In some embodiments, each arm may comprise a same outer diameter. In other embodiments, a first arm may comprise a first outer diameter, and a second arm may comprise a second outer diameter.

In some embodiments the arms of the plurality of combustion simulating elements may comprise a length in a range from about 6 inches to about 6 feet (e.g., from about 12 inches to about 36 inches, from about 18 inches to about 24 inches, or any length or range of lengths from about 6 inches to about 6 feet). In some embodiments, each arm of the plurality of combustion simulating elements may comprise a same length. In other embodiments, the arms may have various lengths, e.g., (1) each arm having a different length, (2) two or more arms having a first length and two or more other arms having a second length, etc.

In some embodiments, one or more arms of the combustion simulation elements may comprise a flexible, supple material which is operable to allow the first end thereof (e.g., with the light-emitting device) to bend under the force of gravity to follow a natural falling path (e.g., in the direction of the initial expelling force, and then naturally being overcome by gravity) after being expelled from the sleeve. In some embodiments, the flexible material may comprise at least one of a rubber, a woven polymeric material, or another natural or synthetic flexible material, and the like.

In some embodiments, each arm may comprise a semi-rigid (e.g., flexible) material which is operable to retain a curved shape when not inside the sleeve (e.g., in the second position), and which is flexible enough to conform to a straightened shape when retracted into the sleeve (e.g., in the first position). In some embodiments, the semi-rigid material may comprise at least one of a resilient metal alloy (e.g., spring steel), a resilient polymeric material, a rubber, another natural or synthetic semi-rigid material, and the like. In some embodiments, the curved shape may comprise a substantially parabolic shape which approximates the path of a spark expelled in a substantially vertical or near-vertical direction (e.g., from about 1 degree to about 60 degrees off of vertical) from an explosion. In other embodiments, the curved shape may comprise another shape which approximates the path of a spark expelled from an explosion. In some embodiments, a first arm may comprise a first curved shape, and a second arm may comprise a second curved shape. In some embodiments, each arm of the plurality of combustion simulating elements may comprise a different curved shape. In some embodiments, each arm may comprise a sheath, the sheath comprising a supple protective material (e.g., at least one of a rubber, a woven material, leather, another natural or synthetic supple material, and the like) layered on top of the semi-rigid or flexible material.

Each arm of the combustion simulating elements may comprise an axial element for delivering electric current or light to the light-emitting device. In some embodiments, the axial element may comprise material which conducts electrical current (e.g., a metal wire) and provide electronic communication between the light-emitting device and a power source or a controller. In other embodiments, the axial element may comprise a material which conducts light (e.g., a fiber optic line) and provide a path for delivering light from a light source to the light-emitting device.

The light-emitting device may comprise any device operable to emit light on demand. The light-emitting device may be in electronic communication with at least one of a power source (e.g., a wall outlet, a generator, or a battery) and a controller. In some embodiments, the light-emitting device may be a light-emitting device operable with an electrical current, such as a light-emitting diode, a fiber optic emitter, a halogen lamp, a metal halide lamp, a neon lamp, a high intensity discharge lamp, an incandescent bulb, and the like.

In some embodiments, the light-emitting device may be an LED operable to emit light of a first color and/or first intensity and then switch to emitting light of a second color and/or second intensity. In some embodiments, the light-emitting device (e.g., an LED) may be operable to change the emitted light color and/or intensity as a function of time after actuation (e.g., start as a bright yellow light and fade to a dark orange over a period of time ranging from about 0.5 second to about 5 seconds), or depending on the distance traveled from the first position to the second position (e.g., start as a bright blue light at the first position and transition to a dimmer white light as the light-emitting device moves toward the second position). In some embodiments, a first light-emitting device may emit a light of a first color and intensity, and a second light-emitting device may emit a light of a second color and intensity.

The sleeve may comprise a rigid, substantially cylindrical shape defining a channel, and having a first end and a second end. The first proximal end of the sleeve may be located in proximity to the actuator. The second distal end of the sleeve may comprise an opening through which the first ends of the combustion simulating elements emerge upon actuation. The channel may comprise an inner diameter chosen to allow the plurality of combustion simulating elements to pass through the channel rapidly and without becoming tangled. In some embodiments, the inner diameter may be in a range from about ½ inch to about 3 inches (e.g., from about ¾ inch to about 2 inches, or from about 1 inch to about 1½ inches). The sleeve may comprise any rigid material of sufficient strength to support the combustion simulating elements. In some embodiments, the sleeve may comprise at least one of a metal, a metal alloy, a rigid polymeric material (e.g., polycarbonate, polyvinyl chloride [PVC], polyethylene terephthalate [PET], etc.), wood, carbon fiber, or another similar natural or synthetic rigid material.

In some embodiments, the sleeve may comprise a plurality of sleeves (e.g., a bundle of sleeves) to aid in retracting the combustion simulating elements in an orderly repeatable manner. Each sleeve of the plurality of sleeves comprising an inner diameter chosen to allow the rapid passage of a single or small number of combustion simulating elements. In some embodiments, each sleeve of the plurality of sleeves may be axially aligned (e.g., each may have a central axis in parallel with each of the other central axes). In other embodiments, the central axes of the plurality of sleeves may not be parallel.

In some embodiments, each of the arms may have an individual sheaths that nest within the sleeve. The sheaths may serve the purpose of holding the flexible arms along a straight path trajectory for a limited distance before the flexible arms extend from the end of the sheaths. The sheaths may be used to give the initial impression that the light emitters at the ends of the flexible arms are sparks that have been expelled, launched, or otherwise projected at a velocity sufficient to temporarily overcome gravity and travel on a straight or upward path. Once the sheaths have been fully extended, the actuator may project the flexible arms past the end of the sheaths, at which point the flexible arms fall toward the ground, giving the impression that the sparks are descending. Each of the sheaths can be extended for a predetermined distance that is less than the total distance to which the corresponding arm may be extended. Once the sheaths are fully extended, the actuator may project the flexible arms from the sheaths such that they fall toward the ground. In some examples, individual sheaths may have varying lengths to give the impression that the sparks have naturally diverging paths.

In some embodiments, the sleeve may be extendable the purpose of projecting the flexible arms along a straight path trajectory for a predetermined distance before the flexible arms extend from the end of the sleeve. Once the sleeve have been fully extended, the actuator may project the flexible arms past the end of the sleeve, at which point the flexible arms fall toward the ground, giving the impression that the sparks are descending.

The static light-emitting device may comprise any device operable to emit light on demand. The static light-emitting device may be in electronic communication with at least one of a power source (e.g., a wall outlet, a generator, or a battery) and a controller (e.g., via at least one of a wire or circuit leading to the power source or controller). The static light-emitting device may be mounted in proximity to the sleeve (e.g., located at the first end of the sleeve, or on a support structure adjacent thereto) such that light emitted from the static light-emitting device may simulate a spark generating source (e.g., an ember, or an electric arc) which is a prelude to the spark effect provided by the emergence of the plurality of combustion simulating elements from the sleeve. In some embodiments, the static light-emitting device may comprise at least one of a light-emitting diode, a fiber optic emitter a halogen lamp, a metal halide lamp, a neon lamp, a high intensity discharge lamp, an incandescent bulb, and the like. The static light-emitting device may be operable to emit light of a first color and first intensity, and switch to emitting light of a second color and/or second intensity. For example, the static light emitting device may include one or more light emitting diodes operable to emit light of different wavelengths and dim as the controller delivers varying power levels to the LEDs. In some embodiments, the static light-emitting device may be operable to change the emitted light color and/or intensity as a function of time in coordination with the actuation of the combustion simulating elements. For example, the static light-emitting devices may be activated with the highest intensity before actuation and extension of the combustion simulating elements and the controller may then reduce the amount of power provided to the static light-emitting devices over a predetermined period of time at a pre-determined rate after the combustion simulating elements have been actuated, giving the impression that the static light-emitting device the appearance of a fading ember. In some embodiments, the light-emitting device may comprise a plurality of light emitting diodes arranged in a row around at least a portion of the perimeter of the first end of the sleeve.

The actuator may comprise any mechanism operable to cause the combustion simulation elements to quickly move from a first position (e.g., inside the sleeve) to a second position (e.g., outside the sleeve). The actuator may comprise an extension member which is mechanically extended by the action of at least one of an electrical actuator (e.g., a solenoid), a pneumatic actuator, a magnetic actuator, or a mechanical actuator. In some embodiments, the actuator may be connected to each of: 1) a controller via electrical communication; 2) a power source (e.g., a wall outlet, a generator, a battery, or a compressed air source) via a connection appropriate for the type of power source; and 3) to a proximal end of each of the combustion simulation elements via a mechanical connection. In some embodiments, the extension member may comprise a rod mechanically attached (e.g., via a rigid band, recessed seating within the rod, an adhesive, a clamp, a tie-down, and/or other appropriate mechanisms) to the proximal ends of the plurality of combustion simulating elements, the rod being operable to push the proximal ends of the combustion simulating elements toward the distal end of the sleeve.

In some embodiments, the actuator may comprise a predetermined stroke length (e.g., the length to which the extension member is extended), such that the first ends of the combustion simulating elements are extended out of the sleeve to a predetermined length. For example, the combustion simulating elements may be extended in a predetermined range from about 6 inches to about 5 feet (e.g., including but not limited to a range from about 12 inches to about 36 inches, or from about 18 inches to about 24 inches). In some embodiments, the actuator may be operable to extend the extension member at a speed in a range from about 0.5 meters per second to about 10 meters per second (e.g., including but not limited to a range from about 1 meters per second to about 5 meters per second, or an speed or range of speeds therein). In some embodiments, the actuator may be operable to alter the speed of the extension member as it is extended (e.g., starting at a speed of about 3 meters per second and slowing to a speed of about 0.5 meters per second), in turn slowing the speed of the light-emitting devices as they progress from the first position to the second position, such that the simulated sparks of the special effects device appear to slow down. The speed at which the combustion simulating devices are extended can also be increased during extension.

The controller may comprise any system operable to initiate the actuator (e.g., cause the actuator to extend the extension member) and control the lighting of the light-emitting devices (e.g., causing the light-emitting devices to light up upon actuation, change a color and/or intensity of light as a function of time or position, and shut off the light prior to being retracted back to the first position). In some embodiments, the controller may further control the lighting of the static light-emitting device (e.g., causing the static light-emitting device to light up prior to actuation, change a color and/or intensity of light as a function of time, and shut off the light upon actuation). In other embodiments, the controller may comprise a computer device having a central processor and a memory, the computer device being operable to initiate the actuator, cause the retraction of the actuator (e.g., moving the combustion simulating elements from the second position back to the first position), and control the intensity and/or color of each individual light-emitting device and static light-emitting devices. In some embodiments, the controller may be operable to be programmed to have a timer or countdown for initiation of the actuator, and to change the intensity and/or color of the static light-emitting devices and the light-emitting device. In some embodiments, the controller may be programmable to cause the plurality of light-emitting devices to shut off at different times or at different positions relative to the first or second position (e.g., to make it appear that the sparks may be winking out at different times). In some embodiments, the controller may be operable to integrate such controls with control of the visual and/or audio effects of a combustion effect system (e.g., initiation of the visual and/or audio effect, and changing of the visual and/or audio effect as a function of time).

In some embodiments, the controller may allow for easy integration of control of the special effects device into the control of lighting and other aspects of a stage show or amusement park attraction. In some embodiments, the controller may comprise a commercially available control system (e.g., a Digital MultipleX [DMX] compliant system). The controller may connect and control a wide variety of commercially available of lighting fixtures, devices and accessories, allowing for coordinated effects. The controller may coordinate with effects systems govern different types of effects using motor engines, lamps, devices for generating lights, sound, fogs and other effects. The controller may include a central console using DMX protocol. For example, the controller may be operable to activate the combustion simulation effect (a second effect) in coordination with a first effect, such as a collision (e.g., a falling object or vehicle crash) or simulated explosion. The controller may, after the first effect and a pre-determined delay period, activate the combustion simulation effect of the present invention.

In other embodiments, the controller may be set up for manual control of the static light-emitting devices, the combustion simulating devices, and the actuator. In such embodiments, the controller may comprise a switchboard having at least one toggle switch for initiating actuation, and at least one dial for controlling an intensity and/or color of light.

In one aspect, the invention relates to a device for simulating combustion, comprising: a plurality of combustion-simulating elements, each having a light-emitting device; a sleeve for holding said plurality of combustion-simulating elements in first positions; and an actuator for protruding said combustion-simulating elements from said sleeve into second positions, wherein said light-emitting devices of said combustion-simulating elements are more spatially dispersed than in said first positions. In some implementations, the light-emitting device is a light emitting diode. In some implementations, the actuator is operable to protrude the combustion-simulating elements at a rate in a range of about 0.5 meters per second to about 5 meters per second. In some implementations, the device may further comprise static light-emitting device in proximity to said sleeve. In some implementations, the static light-emitting device simulates a spark generating source. In some implementations, the light-emitting devices simulate scattering sparks when the combustion-simulating elements move from the first positions to the second positions. In some implementations, the device may further comprise a combustion effect system that includes at least one of a flame-simulating element, an explosion-simulating element, and an electrical arc simulating element. In some implementations, the combustion effect system is operable to generate visual and audio effects simulating a combustion event. In some implementations, the actuator is operable to protrude the combustion simulating elements at the same time as the visual and audio effects or after a pre-determined delay period following the visual and audio effects.

In some implementations, each of said light-emitting devices is operable to change an intensity of light emitted therefrom depending on at least one of a distance traveled from the first position to the second position, and the time elapsed from actuation. In some implementations, each of the light-emitting devices is operable to change a color of light emitted therefrom depending on at least one of a distance traveled from the first position to the second position, and a time elapsed from actuation. In some implementations, the static light-emitting device is operable to change an intensity of light emitted therefrom as a function of time. In some implementations, the static light-emitting device is operable to change a color of light emitted therefrom as a function of time. In some implementations, the actuator comprises an extension element attached to a second end of the plurality of combustion-simulating elements and the actuator is operable to change a speed of the extension element as a function of time after actuation. In some implementations, the extension element is operable to slow down as a function of time after actuation, such that said sparks appear to slow down due to wind resistance. In some implementations, the device may further comprise a controller, the controller being operable to control the actuator, the light-emitting devices, and the static light-emitting device. In some implementations, the controller is operable to control the combustion effect system, and coordinate the combustion effect system with the actuator, the light-emitting devices, and the static light-emitting device. In some implementations, each of the plurality of combustion simulating elements comprises an arm having a first end and a second end, the first end comprising a light-emitting device, the second end comprising a connection to the actuator and to a controller, and the arm comprising a semi-rigid material operable to retain a curved shape when outside of the sleeve.

In another aspect, the invention relates to a device for simulating sparks caused by a combustion event, the device comprising: a plurality of combustion simulating elements for simulating the sparks, each of the combustion simulating elements comprising a first end having a light-emitting device, a second end connected to an actuator, and a semi-rigid material operable to retain a curved shape in a second position; a sleeve defining a channel for holding the plurality of combustion simulating elements in a first position, the sleeve comprising a static light-emitting device at an end thereof for simulating a spark generating source; the actuator comprising an extension element operable to push the combustion simulating elements into the second position wherein the light-emitting devices are more spatially dispersed than in the first position; a combustion effect system operable to generate visual and audio effects simulating a combustion event; and a controller for controlling and coordinating the actuator, the light-emitting devices, the static light-emitting device, and the combustion effect system.

In another aspect, the invention relates to a method of using a device for simulating combustion, comprising the steps of: providing a sleeve for holding a plurality of combustion-simulating elements in a first position, each of the combustion-simulating elements comprising a first end and a second end, the first end comprising a light-emitting device; attaching the second ends to an actuator for protruding the combustion-simulating elements from the sleeve into second positions, wherein the light-emitting devices of the combustion-simulating elements are more spatially dispersed than in the first positions; putting the plurality of combustion-simulating elements and the actuator in electronic communication with a controller for controlling the light-emitting devices and the actuator; and initiating the actuator.

Further aspects and embodiments will be apparent to those having skill in the art from the description and disclosure provided herein.

It is an object of the present invention to provide a special effects device for simulating sparks generated by combustion, electricity, or other means.

It is a further object of the present invention to provide special effects device may be coordinated with a device for simulating combustion to give the impression of sparks generated by a combustion source It is a further object of the present invention to provide special effects device for use in a number of settings, such incorporation into an attraction at an amusement park, a theatre production, or a commercial display.

It is a further object of the present invention to provide a special effects device which increase safety by eliminating open flame and actual sparks.

It is a further object of the present invention to reduce installation and energy costs and be environmentally friendly by using energy efficient lighting rather than combustible fuel.

It is a further object of the present invention to reduce costs by requiring very little maintenance in comparison to conventional combustion special effect systems.

It is a further object of the present invention to provide a special effects device which may be coordinated with a combustion effect system which simulates a combustion source giving rise to the simulated sparks of the present invention.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 1A provides a perspective view of a special effects device prior to actuation, according to an embodiment of the present invention.

FIG. 1B provides a perspective view of a special effects device after actuation, according to an embodiment of the present invention.

FIG. 2A provides a perspective view of a special effects device prior to actuation, according to an embodiment of the present invention.

FIG. 2B provides a perspective view of a special effects device after actuation, according to an embodiment of the present invention.

FIG. 2D provides a perspective view of a special effects device after actuation, according to an embodiment of the present invention.

DETAILED DESCRIPTION

Figure 2C:
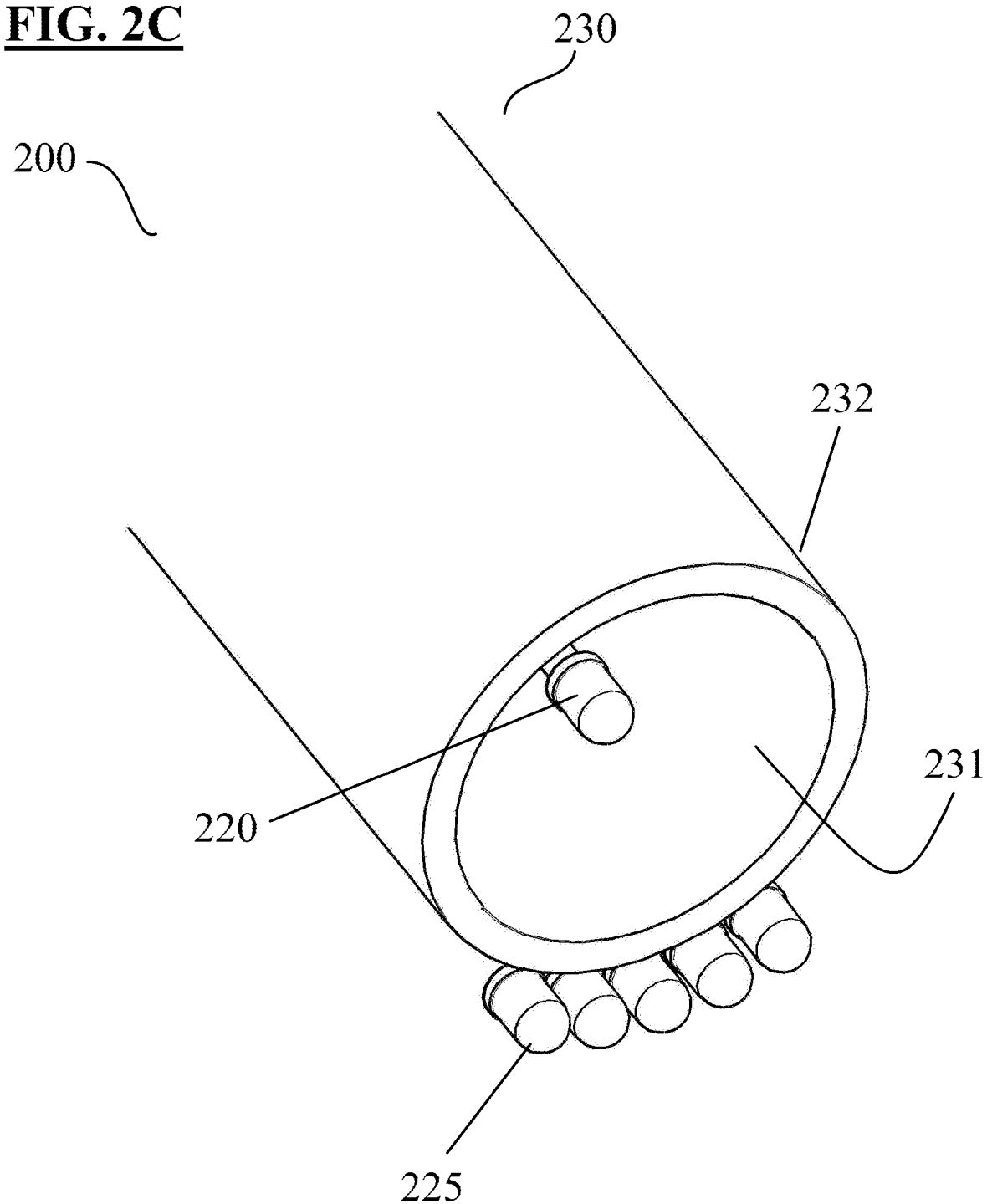
FIG. 2C provides a perspective view of a special effects device prior to actuation, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns a special effects device 100 which may comprise a plurality of combustion simulating elements 110, each having a light-emitting device 120; a sleeve 130 for holding the plurality of combustion-simulating elements 110 in first positions (see, e.g., FIG. 1A); an actuator 140 for protruding the combustion-simulating elements 110 out of the sleeve 130 and into second positions (see, e.g., FIG. 1B), wherein the light-emitting devices 120 are more spatially dispersed than in the first positions; and a controller 150 for controlling the light-emitting devices 120 and the actuator 140. In some embodiments, the special effects device 100 may further comprise at least one static light-emitting device 125 positioned at the end of the sleeve 130.

As seen in FIG. 1A, the present invention may comprise a plurality of combustion simulating elements 110, each comprising an arm 111 with a first end 113 and a second end 112, the second end 112 comprising the light-emitting device 120, and the first end 113 comprising a connection 114 to an extension member 141 of the actuator 140. The arms 111 of the plurality of combustion simulating elements may comprise lengths in a range, e.g., from about 10 inches to about 48 inches, wherein each arm 111 may comprise a different length. In some embodiments, the arms 111 may comprise a resilient material which is operable to retain a curved shape when not inside the sleeve 130 (e.g., in the second position, see FIG. 1B), and which is flexible enough to conform to a straightened shape when inside the sleeve 130 (e.g., in the first position, see FIG. 1A). The curved shape may comprise a substantially parabolic shape which approximates the path of a spark expelled in a substantially vertical or near-vertical direction from an explosion.

The special effects device 100 may be used in combination with a combustion effect system 160, the combustion effect system 160 comprising a display 162 (e.g., a monitor) for showing a visual effect, and an audio emitter 163 (e.g., a speaker) for sounding an audio effect. In other embodiments, the special effects device 100 may be used in combination with other light effects (e.g., simulating an explosion, fire, or other combustion effect).

The light-emitting device 120 may comprise a light-emitting diode and may be operable to emit light of a first color and first intensity and then switch to emitting light of a second color and/or second intensity. The controller 150 may be operable to change the emitted light color and/or intensity of light-emitting device 120 as a function of a predetermined parameter, such as time after actuation (e.g., causing the extension member 141 to extend toward the sleeve 130), or depending on the distance traveled from the first position to the second position.

The sleeve 130 may comprise a rigid, substantially cylindrical shape defining a channel 131, and having a first end 133 and a second end 132. The second end 132 may be distal in relation to the actuator 140 and may comprise an opening through which the first ends 112 of the combustion simulating elements 110 emerge upon actuation, and the first end 133 may be proximal to the actuator 140. The channel 131 may comprise an inner diameter chosen to allow the plurality of combustion simulating elements 110 to pass through the channel rapidly and without becoming tangled. The sleeve 130 may comprise any rigid material of sufficient strength to support the combustion simulating elements as they move in and out of the sleeve 130 and resist damage from operation of the special effects device 100.

The static light-emitting device 125 may comprise a plurality of light-emitting diodes arranged in a row around a portion of the circumference of the second end 132 of the sleeve 130, such that light emitted from the static light-emitting device 125 may simulate a combustion source or ignition point (e.g., an ember, or an electric arc) for the sparks simulated by the combustion simulating elements 120. The static light-emitting device 125 may be operable to emit light of a first color and first intensity and switch to emitting light of a second color and/or second intensity as a function of time prior to actuation.

The actuator 140 may comprise any mechanism operable to cause the combustion simulation elements to quickly move from a first position (e.g., inside the sleeve, see FIG. 1A) to a second position (e.g., outside the sleeve, see FIG. 1B). The actuator 140 may comprise an extension member 141 which is mechanically extended by the action (e.g., electric actuation) of the actuator 140. The actuator 140 may be in electronic communication with the controller 150. The extension member 141 may comprise a rod mechanically attached via a rigid band 114 at the first ends 113 of a bundle of combustion simulation elements 110, the rod 141 being operable to push the first ends 113 toward the second end 132 of the sleeve 130. The actuator 140 may comprise a predetermined stroke length (e.g., the length to which the extension member is extended), such that the first ends 112 of the combustion simulating elements 110 are extended out of the sleeve 130 to predetermined lengths.

The controller 150 may comprise any system operable to initiate the actuator 140 and control the light-emitting devices 120 (e.g., light up upon actuation, change color and/or intensity as a function of time or position, and shut off prior to being retracted back to the first position) and static light-emitting devices 125 (e.g., light up prior to actuation, change color and/or intensity as a function of time, and shut off upon actuation). In some embodiments, the controller may comprise a switchboard having at least a first toggle switch 151 for causing actuation and a first dial 152 for controlling the intensity of the light-emitting devices 120, and a second toggle switch 153 for initiating the lighting of the static light-emitting device 125 and a second dial 153 for controlling the intensity of the static light-emitting device 125.

In other embodiments, the controller may be operable to connect with a central control system, e.g., a general purpose computer having software operable to run controllers of multiple effects devices. The central control system may be in electronic communication with the controller for light-emitting devices 120 and the actuator 140. The central control system may provide activation signals to the controller for the light-emitting devices 120 and the actuator 140 via wired or wireless signal. The central control system may be additionally in electronic communication with one or more additional special or theatrical effect devices. In some embodiments central control system may transmit data in an industry standard format, e.g. Digital MultipleX (DMX) format, to the controller for light-emitting devices 120 and the actuator 140 and the controllers for other effect devices. The central control system may be operable and have programming that coordinates different combustion effect devices to create a coordinated realistic overall effect that simulates, e.g., an explosion, canon fire, etc.

In another embodiment, as seen in FIGS. 2A-2D, the special effects device 200 may comprise a sleeve 230 defining a channel 231 operable to house at least a portion of the arms 211 of a plurality of combustion simulating elements 210. The sleeve 230 may have a first end 232 and a second end 233, the second end 233 comprising a static light-emitting device 225 (e.g., a plurality of light emitting diodes). The plurality of combustion simulating elements 210 may each have an arm 211 with a first end 213 and a second end 212, the first ends 213 each comprising a light-emitting device 220. FIG. 2A and FIG. 2C show the plurality of combustion simulating elements 210 in a first position, and FIGS. 2B and 2D show the plurality of combustion simulating elements 210 in a second position, after actuation via a controller and actuator (see FIG. 1A), wherein the light-emitting devices are more spatially dispersed than in the first position. The arms 211 may each comprise a flexible material operable to fall out of the sleeve 230 with gravity, e.g., to give the impression of falling sparks.

The special effects device 200 may be used in combination with a combustion effect system, the combustion effect system comprising a projection or display screen (e.g., a VFX projection screen, a curved or flat panel display) for showing a visual effect. Alternatively, the special effects device 200 may be combined with a practical effect device, such as an air canon that projects colored smoke and/or other practical effect. The special effects device 200 may also be used in combination with an audio emitter (e.g., a speaker) for sounding an audio effect. In other embodiments, the special effects device 200 may be used in combination with other light effects (e.g., simulating an explosion, fire, or other combustion effect).

The light-emitting devices 220 may comprise a light-emitting diode and may be operable to emit light of a first color and first intensity and then switch to emitting light of a second color and/or second intensity. A controller may be in electronic communication with the light-emitting devices 220 and operable to change the emitted light color and/or intensity of light-emitting device 220 as a function of a predetermined parameter, such as time after actuation (e.g., causing the actuator to extend the light-emitting devices 220 from the sleeve 230), or depending on the distance traveled from the first position to the second position.

The sleeve 230 may comprise a rigid, substantially cylindrical shape defining a channel 231. The sleeve 230 may comprise any rigid material of sufficient strength to support the combustion simulating elements as they move in and out of the sleeve 230 and resist damage from operation of the special effects device 200. The sleeve 230 may have a first end 232 and a second end 233. The second end 233 may be distal in relation to the actuator and may comprise an opening through which the distal ends 212 of the combustion simulating elements 210 emerge upon actuation, and the end 232 may be proximal to the actuator. The channel 231 may comprise an inner diameter chosen to allow the plurality of combustion simulating elements 210 to pass through the channel rapidly and without becoming tangled.

The static light-emitting devices 225 may comprise a plurality of light-emitting diodes arranged in a row around a portion of the circumference of the second end 233 of the sleeve 230, such that light emitted from the static light-emitting devices 225 may simulate a combustion source or ignition point (e.g., an ember, or an electric arc) for the sparks simulated by the combustion simulating elements 220. The static light-emitting devices 225 may be operable to emit light of a first color and first intensity and switch to emitting light of a second color and/or second intensity as a function of time prior to actuation.

The actuator may comprise any mechanism operable to cause the combustion simulation elements to quickly move from a first position to a second position (e.g., compare FIGS. 2A and 2B). The actuator may comprise an extension member which is mechanically extended by the action (e.g., electric actuation) of the actuator. The actuator may be in electronic communication with the controller, which provides an electronic communication or electrical signal to activate the actuator at a pre-determined time. The actuator may have a predetermined stroke length (e.g., the length to which the extension member is extended), such that the distal ends 212 of the combustion simulating elements 210 are extended out of the sleeve 230 to predetermined lengths.

The controller may comprise any system operable to initiate the actuator and control the light-emitting devices 220 (e.g., light up upon actuation, change color and/or intensity as a function of time or position, and shut off prior to being retracted back to the first position) and static light-emitting devices 225 (e.g., light up prior to actuation, change color and/or intensity as a function of time, and shut off upon actuation). In some embodiments, the controller may be operable to connect with a central control system, e.g., a general purpose computer having software operable to run controllers of multiple effects devices. The central control system may be in electronic communication with the controller for light-emitting devices 220 and the actuator. The central control system may provide activation signals to the controller for the light-emitting devices 220 and the actuator via wired or wireless signal. The central control system may be additionally in electronic communication with one or more additional special or theatrical effect devices. In some embodiments, central control system may transmit data in an industry standard format, e.g. Digital MultipleX (DMX) format, to the controller for light-emitting devices 220 and the actuator and the controllers for other effect devices. The central control system may be operable and have programming that coordinates different combustion effect devices to create a coordinated realistic overall effect that simulates, e.g., an explosion, canon fire, etc.

The present special effects device and methods are capable of simulating sparks expelled from a combustion event in a safe, low energy, and easily reproducible manner. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A device for simulating combustion, comprising:
a housing;
a plurality of combustion-simulating elements in respective first positions in the housing and including light-emitting devices disposed on elongated bodies, each combustion-simulating element of the plurality of combustion-simulating elements having a light-emitting device of the light-emitting devices and an elongate body of the elongated bodies; and
an actuator configured to extend the plurality of combustion-simulating elements out of the housing into respective second positions, wherein the light-emitting devices of the plurality of combustion-simulating elements are more spatially dispersed from each other in the second positions than in the first positions.

2. The device of claim 1, wherein the actuator is operable to protrude the plurality of combustion-simulating elements at a rate in a range of about 0.5 meters per second to about 5 meters per second.

3. The device of claim 1, comprising a static light-emitting device in proximity to the housing of the device.

4. The device of claim 1, wherein the light-emitting devices are configured to simulate scattering sparks when the plurality of combustion-simulating elements are actuated from the first positions to the second positions.

5. The device of claim 1, wherein the actuator is operable to protrude the plurality of combustion-simulating elements at the same time as visual and audio effects simulating a combustion event or after a predetermined delay period following the visual and audio effects.

6. The device of claim 1, wherein each of the light-emitting devices is operable to change an intensity of light emitted therefrom depending on a distance of light-emitting device travel or a time elapsed from actuation of the actuator.

7. The device of claim 1, wherein each of the light-emitting devices is operable to change a color of light emitted therefrom depending on at least one of a distance of light-emitting device travel or a time elapsed from actuation of the actuator.

8. The device of claim 1, comprising a controller, the controller being operable to control the actuator, the light-emitting devices, and a static light-emitting device in coordination.

9. The device of claim 1, wherein the elongate bodies of the plurality of combustion-simulating elements comprise flexible material operable to bend under its own weight when extended from the housing.

10. The device of claim 1, wherein each of the elongate bodies comprises a semi-rigid material operable to retain a curved shape when outside of the housing.

11. A device for simulating sparks caused by a combustion event, the device comprising:
- a plurality of combustion-simulating elements configured to simulate the sparks, each combustion-simulating element of the plurality of combustion-simulating elements comprising an arm with a first end connected to an actuator, and a second end having a light-emitting device;
- the actuator comprising an extension element operable to push the plurality of combustion-simulating combustion simulating elements outwardly from a first position within a housing into a second position wherein respective light-emitting devices of the plurality of combustion-simulating elements are more spatially dispersed in the second position than in the first position; and
- a combustion effect system operable to generate visual and audio effects simulating the combustion event.

12. The device of claim 11, wherein the actuator is operable to protrude the plurality of combustion-simulating elements at the same time as the visual and audio effects or after a predetermined delay period following the visual and audio effects.

13. The device of claim 11, wherein the extension element is operable to change a speed of pushing as a function of time after actuation.

14. The device of claim 13, wherein the extension element is operable to slow down the pushing as a function of time after actuation, such that the sparks appear to slow down due to wind resistance.

15. The device of claim 11, comprising a sleeve defining a channel within the housing for holding the plurality of combustion-simulating elements in the first position, the sleeve comprising a static light-emitting device at an end thereof for simulating a spark generating source, wherein the plurality of combustion-simulating elements comprise a flexible material operable to fall toward a ground under its own weight when extended from the sleeve.

16. The device of claim 11, wherein each of the plurality of combustion-simulating elements comprises the arm having a first end and a second end, the first end of the arm comprising the light-emitting device, the second end of the arm comprising a connection to the actuator and to a controller, and the arm comprising a semi-rigid material operable to retain a curved shape when outside of the sleeve.

17. The device of claim 11, comprising a controller for controlling and coordinating the actuator, the light-emitting devices, and the combustion effect system.

18. A method of using a device for simulating combustion, comprising the steps of:
- positioning a plurality of combustion-simulating elements in first positions in a housing, each of the plurality of combustion-simulating elements comprising an elongate body with a proximal end and a distal end, the distal end comprising a light-emitting device;
- extending the plurality of combustion-simulating elements into second positions extending out of the housing, wherein the plurality of combustion-simulating elements are extended by an actuator and the light-emitting devices of the combustion-simulating elements are more spatially dispersed from each other in the second positions than in the first positions; and
- activating the light-emitting devices during the extension of the plurality of combustion-simulating elements.

19. The method of claim 18, wherein the actuator is operable to extend the plurality of combustion-simulating elements at the same time as visual and audio effects simulating a combustion event or after a predetermined delay period following the visual and audio effects.

20. The method of claim 18, wherein the plurality of combustion-simulating combustion simulating elements comprise a flexible material operable to bend when extended from the housing.

21. The method of claim 18, comprising connecting the plurality of combustion-simulating elements and the actuator to a controller operable to control the light-emitting devices and the actuator such that they are in electronic communication with the controller.

* * * * *